United States Patent [19]

Scott

[11] Patent Number: 5,059,068
[45] Date of Patent: Oct. 22, 1991

[54] ROTARY SLOT CUTTING TOOLS AND INSERT CLAMPING METHOD

[75] Inventor: David W. Scott, Ruse, Australia

[73] Assignee: A. E. Bishop & Associates Pty., Ltd., New South Wales, Australia

[21] Appl. No.: 561,288

[22] Filed: Aug. 2, 1990

Related U.S. Application Data

[63] Continuation of Ser. No. 324,050, Mar. 16, 1989, abandoned.

[30] Foreign Application Priority Data

Oct. 20, 1988 [AU] Australia .............................. PJ1055

[51] Int. Cl.⁵ .......................... B23C 5/08; B23C 5/22
[52] U.S. Cl. ........................................ 407/9; 407/33; 407/110; 83/845; 175/412; 403/331; 403/381
[58] Field of Search ............ 407/9, 33, 50, 109, 407/110; 83/845; 403/331, 381; 175/374, 410, 412, 413

[56] References Cited

U.S. PATENT DOCUMENTS

| | | | |
|---|---|---|---|
| 447,900 | 3/1891 | Pallen | 407/50 |
| 1,935,069 | 11/1933 | Walker et al. | 407/51 |
| 2,309,410 | 1/1943 | Miller | 407/33 |
| 2,503,951 | 4/1950 | Kelly et al. | 407/50 |
| 3,123,896 | 3/1964 | Wilson | 407/110 |
| 3,887,975 | 6/1975 | Sorice et al. | 407/51 |
| 3,945,289 | 3/1976 | Baez Rios | 83/853 |
| 4,417,833 | 11/1983 | Wertheimer | 407/61 |
| 4,443,136 | 4/1984 | Kemmer | 407/50 |
| 4,645,383 | 2/1987 | Lindsay | 407/50 |

*Primary Examiner*—William E. Terrell
*Attorney, Agent, or Firm*—Hill, Van Santen, Steadman & Simpson

[57] ABSTRACT

A rotary slot cutting tool having a flat sided disc shaped body with a central bore, a plurality of apertures spaced about the periphery of the body each aperture having in it a cutting insert held in position by the shape of the aperture against radial movement, each aperture being shaped in such a manner that on the application of a force acting radially outwards on the circumference on the bore of the body, faces of the aperture are caused to spread apart to permit removal and replacement of the inserts in an axial direction. The invention further provides an insert for use in rotary and other slot cutting tools.

3 Claims, 3 Drawing Sheets

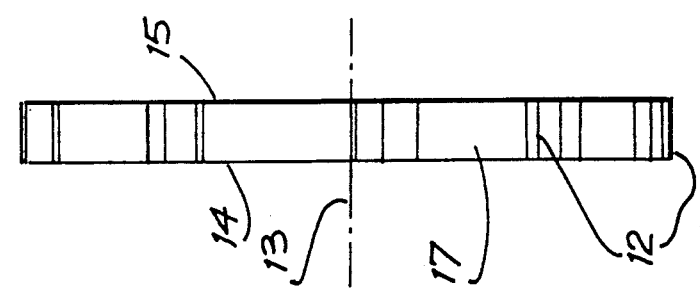
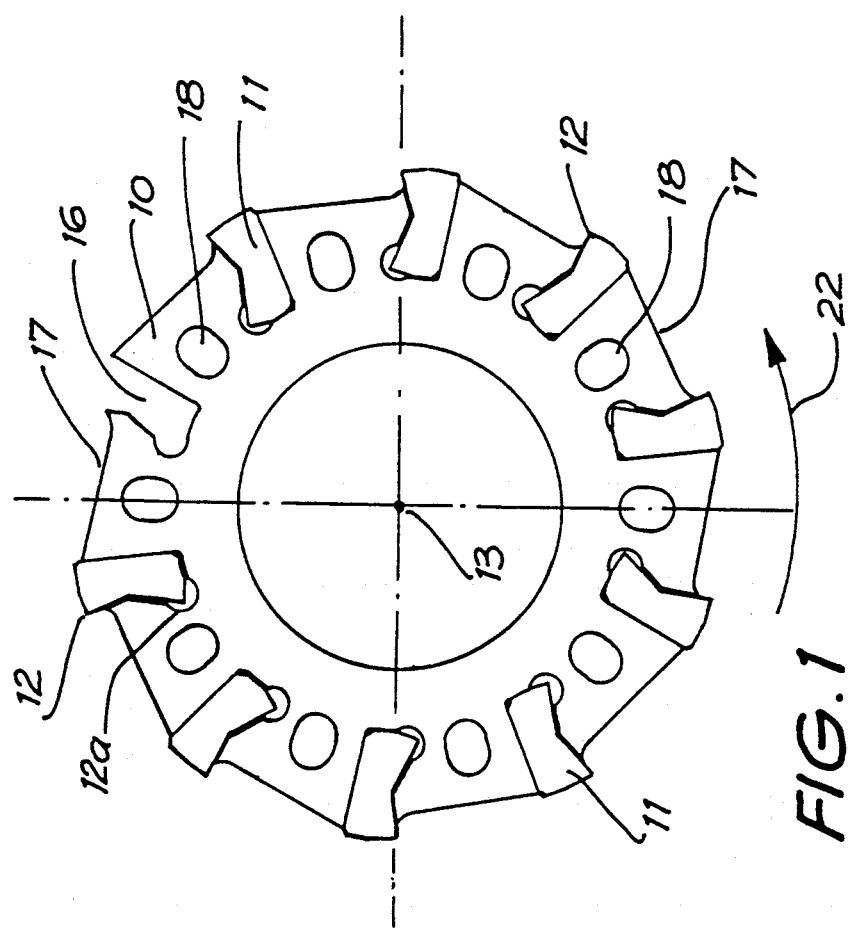

ROTARY SLOT CUTTING TOOLS AND INSERT CLAMPING METHOD

This is a continuation of application Ser. No. 324,050, filed Mar. 16, 1989 abandoned.

The present invention relates to slot cutting tools particularly rotary slot cutting tools and cutting inserts for use therewith.

Rotary slot cutting tools of the kind with which the present invention is concerned consist of a disc-like body having disposable cutting inserts protruding radially from the disc periphery. The cutting inserts must be held firmly to the disc body when in use but must be readily removable for replacement when the cutting edge of the cutting insert is blunted or broken.

There have been many proposals in relation to the manner in which the cutting inserts were held in the body. Such previous proposals may be regarded as falling generally into two categories. In the first category the cutting inserts are held in place in the body by some form of separate retaining means. Typical forms of construction falling in this first category are described and illustrated in U.S. Pat. Nos. 3,887,975 (Sorice et al.) and 4,363,576 (Zweekly). Other forms of construction in this category are shown in U.S. Pat. Nos. 1,618,678 to Rottler and 1,700,333 to Pond. In these constructions with the exception of that of Rottler the cutting inserts are inserted into apertures in the body in a direction parallel to the axis of the body.

The Pond and Sorice et al patents set forth arrangements utilizing camming members which bear against appropriately shaped portions of the cutting inserts to achieve clamping. In such arrangements, the cutting forces exerted on the insert are transmitted directly onto the cam surfaces, which can lead to damaging cam wear. This condition also necessitates a greater body thickness surrounding the camming member. An additional disadvantage of such an approach arises from the necessity of fashioning inserts with the requisite complicated surfaces which must cooperate with the camming member.

The Zweekly patent shows a camming arrangement which bears against a clamping blade which in turn bears against the insert. This blade is welded into the body to ensure integrity of position. This cutter necessitates the use of a multitude of various members to obtain a clamping force onto the inserts. An additional disadvantage of such approach is that the space required for said clamping and camming members limits the number of inserts that can be fitted into the periphery of cutter disc.

In the second category of slot cutting tools the cutting inserts are inserted by movement in a radial direction in relation to the axis of the body and are held in place without the use of separate retaining means. Typical examples of this category of construction are found in U.S. Pat. Nos. 3,590,893 (Burkiewicz) and 4,492,140 (Pano).

Burkiewicz discloses cutting insert clamping via flexible portions of the cutter body. Such flexibility is allegedly obtained by providing additional saw cuts or slit-like apertures in the body positioned between cutting blade pockets. A disadvantage of the Burkiewicz method is that if the cutting radial force is greater than the frictional holding force, the insert would loosen and slip inwards.

The Pano cutter utilizes wedge means of holding inserts into their seats. These seats similarly limit the number of inserts which can be fitted to the cutter periphery with the further disadvantage that the holding force relies on friction. For this reason the speed of rotation must be closely controlled so that the centrifugal force does not exceed the wedging friction force; a further disadvantage is that the insert has only one cutting edge.

The object of the present invention is to provide a rotary slot cutting tool utilizing inserts of relatively simple shape and of a means within the cutter body of positive secure clamping whilst maintaining precise location. The body and the inserts may be of narrow material, the only limitation on the width of which is the strength of the body or the insert, thus eliminating some of the limitations of prior art slot cutting tool designs. A further advantage over previous designs is that substantially more inserts can be fitted into any one cutter body, the result of this is that the metal removal rate per revolution can increase proportionally with the number of inserts in the disc and that the rotational speed does not cause the inserts to loosen. Another advantage is that a configuration of the cutting insert and the aperture into which it is inserted may be adapted to allow two cutting edges per insert.

A further object of the invention is to provide a cutting insert for use with rotary slot or other cutting tools.

The present invention consists in a rotary slot cutting tool comprising a substantially disc-shaped body having first and second lateral surfaces substantially parallel to the plane of rotation and substantially perpendicular to the axis of rotation of the body and having an axially centred bore for receipt of a support shaft of a driving machine spindle, a plurality of apertures spaced about the periphery of the body and extending from one lateral surface to the other and having an opening to the periphery of the body, each aperture having in it a cutting insert, the apertures being bounded by faces closely engaging faces of the insert in such a manner as to prevent radial movement of the insert relative to the axis of the body, each aperture being shaped in such a manner that on the application of a force acting radially outwards on the circumference of the bore of the body, faces of the aperture are caused to spread apart to permit removal and replacement of the inserts in an axial direction, the inserts being held in place by residual elastic force in the disc.

The invention further consists in a cutting tool insert having a cutting end including a cutting edge, and a location end, the location end having substantially planar parallel side faces and being adapted for mounting in an aperture in a cutting tool with said cutting edge exposed, said location end having three substantially planar non-parallel contact surfaces between said side faces thus being substantially prismoidal the said contact surfaces being adapted for contacting surfaces within said aperture two of said contact surfaces being opposed and the third contact surface being juxtaposed therebetween, characterized in that planes containing said opposed contact surfaces when extended in the direction of said cutting end intersect at a point remote from said third contact surface.

In order that the nature of the invention may be better understood a preferred form thereof is hereinafter described by way of example with reference to the accompanying drawings in which:

FIG. 1 is a view taken parallel to the axis of rotation of a rotary slot-cutting tool constructed according to the invention;

FIG. 2 is a view of the tool of FIG. 1 taken normal to the axis of rotation of the body;

Figure 3:
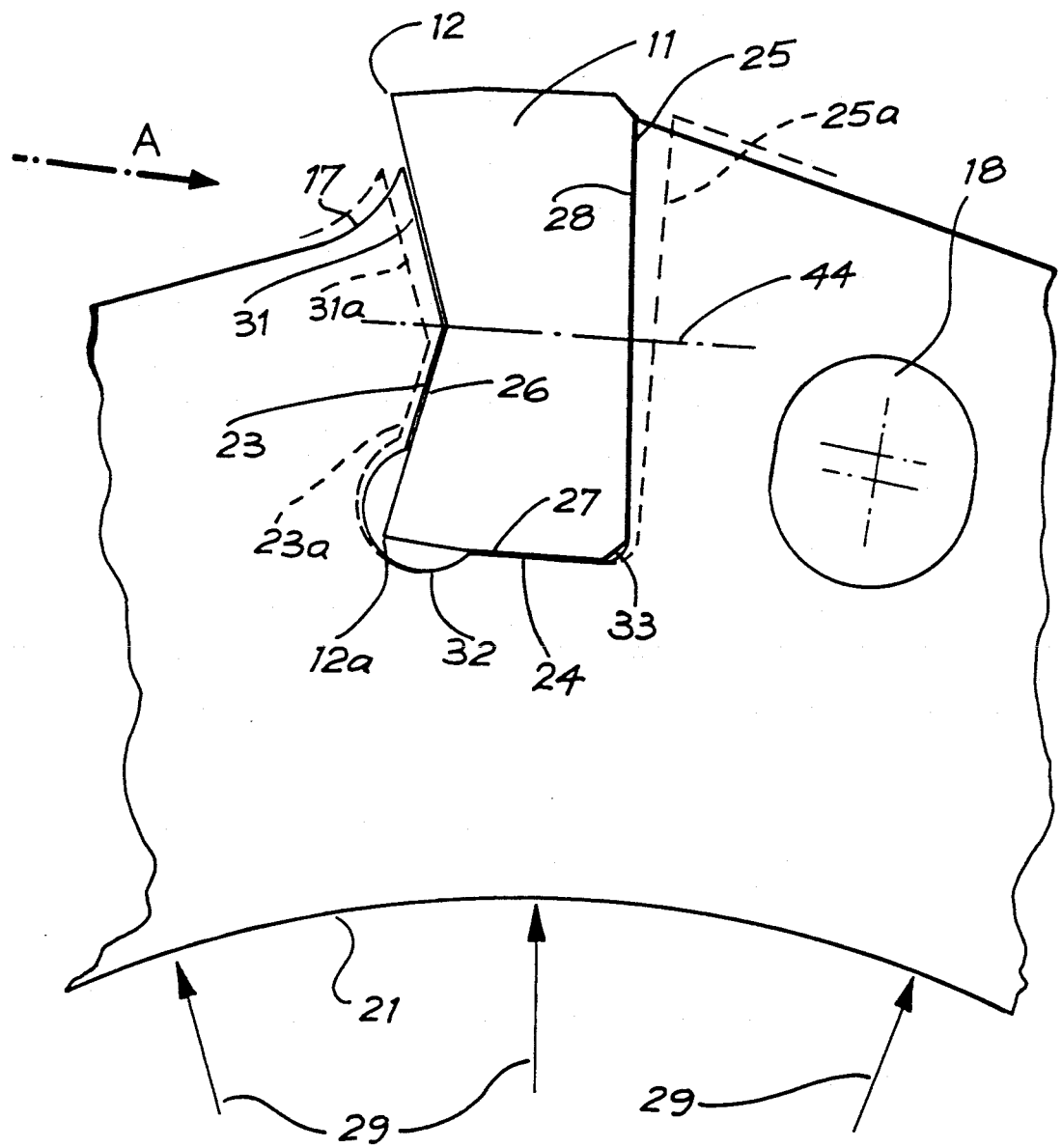
FIG. 3 is an enlarged view of a single aperture and insert and shows the application of a spreading force to the bore of the cutter.

As seen from FIG. 1 each insert 11 has cutting edge 12 protruding radially from the cutter body 10, each cutting edge is substantially parallel to the cutter body axis 13 and is at least as wide as the cutter body.

Cutter body 10 is disc-shaped and of relatively narrow width defined by first and second lateral surfaces 14 and 15. Its periphery is interrupted by identical more or less rectangularly shaped apertures such as 16 (the insert being omitted from this aperture), angularly spaced around its outer diameter, with portion 17 forming the remaining peripheral surface between each of the apertures 16. Elongated holes 18 are located between each adjacent set of apertures. The body 10 has a bore 21 of relatively large diameter and central to the axis 13.

Holes 18 are used to locate the cutter body 10 rotationally and act as rotative driving means from pins (not shown) which drive from a machine spindle (also not shown). The holes 18 are slightly elongated to a more or less oval shape to facilitate the insertion of the pins referred to above. Inserts 11 are located and firmly held one in each of the apertures 16. The cutter body 10 with inserts 11 rotates in direction of arrow 22.

Turning to FIG. 3, each aperture 16 is identical in geometry and intended to clamp the insert 11 on aperture faces 23, 24 and 25 which clamp and locate against insert respective faces 26, 27 and 28. The means of enabling easy assembly of inserts into the pockets is accomplished by expanding the body using an internal collet type tool to apply a radially outwardly directed spreading force 29 in bore 21 which expands the body radially, thus opening each of the apertures as shown by dashed lines 23a, 24 and 25a. An insert is then positioned in each aperture through one of the lateral surfaces 14 or 15 and the spreading force removed from bore 21. The metal will then attempt to return to its normal shape and the aperture faces will make contact with the inserts, thus the residual elastic force in the disc will clamp and locate the inserts.

Inserts are so constructed that they are an amount larger than the apertures 16 of cutter body 10 and insert faces, 26, 27 and 28 and may be duplicated on axis of symmetry 44. Hence cutting edges 12 and 12a may provide two edges for cutting operation. The aperture has also surface 31 which has a minimal clearance with insert face 26 in the clamped position. Surface 17 is formed so as to enable the material being cut to curl and not cause jamming during the cutting operation. At the inner corners of the aperture are radii 32 and 33 which reduce stress concentration in these areas by increasing the length of the stress path.

Figure 4:
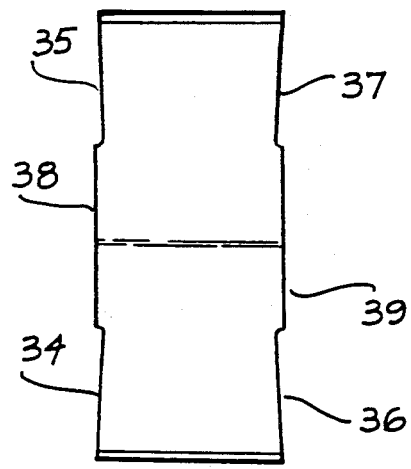
FIG. 4 is a view of the insert of FIG. 3 in the direction of the arrow A.
Figure 5:
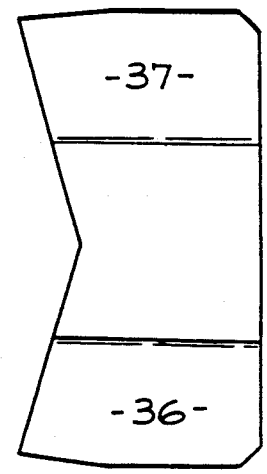
FIG. 5 is a side view of the insert shown in FIG. 3.

Turning to FIGS. 4 and 5 it can be seen that the insert form has side reliefs 34, 35, 36 and 37 of about 2° which clear the back portion of the insert during cutting operations.

To position the inserts accurately axially, side plates can be clamped to the cutter body. These would apply clamping pressure to the insert on faces 38 and 39 to retain correct axial position.

Figure 6:
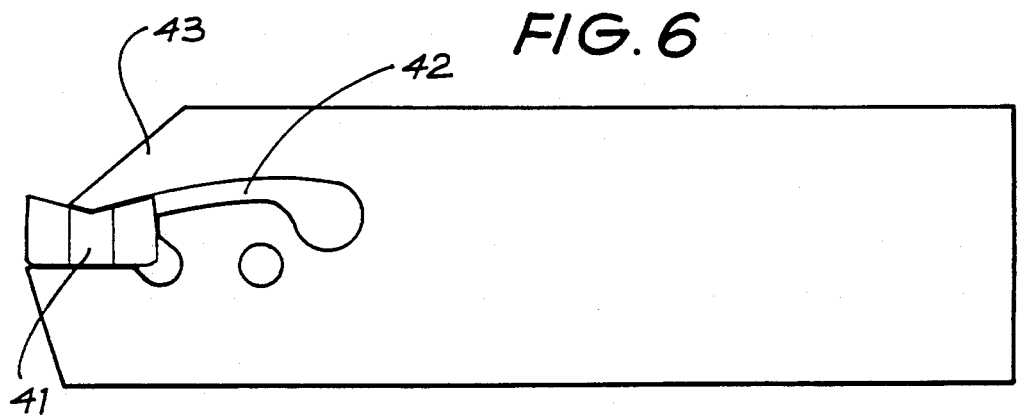
FIG. 6 is a side view of a single type cutter utilizing an insert according to the present invention.

While the present invention is concerned mainly with the construction of rotary slot cutting tools it has been appreciated that inserts constructed according to the invention may also be used in tools that utilize a single cutting insert. Turning to FIG. 6, this shows a single insert holder for grooving operations such as performed on lathes and such other machines which use single point tools. The insert 41 is placed into the holder by levering slot 42 until leaf 43 opens sufficiently. The leaf is then allowed to close and by manufacturing the aperture such that it is slightly smaller than the insert it will clamp and locate similarly to the aperture described in the slotting cutter already described.

Advantages of the invention described arise by means of the fact that the slot cutting tool requires no external camming or wedging devices to retain and accurately clamp the inserts. The cutter body self locks onto the inserts in a manner that enables many inserts to be positioned in the body whilst still maintaining a rigid cutting unit. Also the width of the cutters is not limited, due to the apertures and inserts being constructed with parallel sides, hence widths from less than 1 mm upwards may be constructed.

I claim:

1. A method for removing and or inserting inserts in a rotary cutting tool having a substantially annular-shaped body with first and second lateral faces substantially parallel to a plane of rotation and substantially perpendicular to an axis of rotation, an axially centered bore for receipt of an expansion tool, a plurality of apertures spaced about the periphery of the body, each aperture having opposed insert retaining faces extending from one lateral surface to the other, each said aperture having an opening to the outer periphery of the body, each aperture receiving a cutting insert, comprising the steps of:

applying an expansion force radially outwardly against the circumference of the bore of the body under a respective aperture to cause the opposed faces of the aperture to spread apart to allow free removal and replacement of the insert therein in the axial direction.

2. A rotary slot cutting tool, for rotation in a plane about an axis of rotation, comprising:

a substantially annulus-shaped body defined by the circumference of a large bore on said axis, an outer periphery, and first and second relatively narrowly-spaced lateral surfaces substantially parallel to the plane of rotation and substantially perpendicular to the axis of rotation, the body having a first state when a radial expansion force is applied outwardly against the circumference of said bore and a second state when said radial force is removed;

a plurality of apertures spaced about the outer periphery of the body, each aperture extending substantially parallel to the axis of rotation and including opposed faces extending from one lateral surface to the other and having an opening to the outer periphery of the body; at least one face tapering toward the opposing face as it extends radially outwardly, a cutting insert in each aperture, each having faces complementing the faces of its respective aperture, each aperture having its opposed faces tightly engaging mating faces of the insert solely by means of residual elastic forces stored in said body during said first state to prevent movement of the insert relative to the axis of the body when said body is in its second state, the application of an expansion force radially outward on the circumference of the bore of the body causing the body to assume said first state with opposed faces of the respective aperture spread apart permitting removal and replacement of the inserts in the axial direction only.

3. The structure set forth in claim 2, including aperture means providing for the application of cutting power to said to said tool body tangentially at at least one point radially between the radially innermost extent of an aperture and said outer periphery of said body.

* * * * *